(12) United States Patent
Grawrock (10) Patent No.: US 7,215,781 B2
(45) Date of Patent: May 8, 2007

(54) CREATION AND DISTRIBUTION OF A SECRET VALUE BETWEEN TWO DEVICES

(75) Inventor: David W. Grawrock, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 880 days.

(21) Appl. No.: 09/747,238

(22) Filed: Dec. 22, 2000

(65) Prior Publication Data

US 2002/0083332 A1 Jun. 27, 2002

(51) Int. Cl.
*H04L 9/12* (2006.01)

(52) U.S. Cl. ...................................................... 380/283
(58) Field of Classification Search ........ 713/171–172, 713/192–193, 200; 380/29, 44, 46, 283–285, 380/262
See application file for complete search history.

(56) References Cited

U.S. PATENT DOCUMENTS

| | | | |
|---|---|---|---|
| 3,699,532 A | 10/1972 | Schaffer et al. | |
| 3,996,449 A | 12/1976 | Attanasio et al. | |
| 4,037,214 A | 7/1977 | Birney et al. | |
| 4,162,536 A | 7/1979 | Morley | |
| 4,207,609 A | 6/1980 | Luiz et al. | |
| 4,247,905 A | 1/1981 | Yoshida et al. ............. | 711/166 |
| 4,276,594 A | 6/1981 | Morley | |
| 4,278,837 A | 7/1981 | Best | |
| 4,307,447 A | 12/1981 | Provanzano et al. | |
| 4,319,233 A | 3/1982 | Matsuoka et al. | |
| 4,319,323 A | 3/1982 | Ermolovich et al. | |
| 4,347,565 A | 8/1982 | Kaneda et al. | |
| 4,403,283 A | 9/1983 | Myntti et al. | |
| 4,419,724 A | 12/1983 | Branigin et al. | |
| 4,430,709 A | 2/1984 | Schleupen et al. | |
| 4,521,852 A | 6/1985 | Guttag | |
| 4,571,672 A | 2/1986 | Hatada et al. | |
| 4,663,735 A | 5/1987 | Heller et al. | |
| 4,759,064 A | 7/1988 | Chaum | |

(Continued)

FOREIGN PATENT DOCUMENTS

DE 4217444 12/1992

(Continued)

OTHER PUBLICATIONS

Burns, INTEL: Intel introduces new chipset for intel Pentium III processor-based performance PCs, Nov. 16, 1999, M2 Presswire, p. 1.*

(Continued)

*Primary Examiner*—Kambiz Zand
*Assistant Examiner*—Minh Dinh
(74) *Attorney, Agent, or Firm*—Blakely, Sokoloff, Taylor & Zafman LLP (57) ABSTRACT

In general, one embodiment of the invention features a method comprising operations performed internally within a device. A first operation involves generating data for permanent storage in a protected area of internal memory of the device. This prevents subsequent modification of the data. A second operation involves producing a secret value being a combination of both the data and a short term value generated in response to a periodic event such as a power-up sequence of a platform employing the device.

4 Claims, 4 Drawing Sheets

U.S. PATENT DOCUMENTS

| | | | |
|---|---|---|---|
| 4,795,893 A | 1/1989 | Ugon | |
| 4,802,084 A | 1/1989 | Ikegaya et al. | |
| 4,825,052 A | 4/1989 | Chemin et al. | |
| 4,907,270 A | 3/1990 | Hazard | |
| 4,907,272 A | 3/1990 | Hazard | |
| 4,910,774 A | 3/1990 | Barakat | |
| 4,975,836 A | 12/1990 | Hirosawa et al. | |
| 5,007,082 A | 4/1991 | Cummins | |
| 5,022,077 A | 6/1991 | Bealkowski et al. | |
| 5,075,842 A | 12/1991 | Lai | |
| 5,079,737 A | 1/1992 | Hackbarth | 711/164 |
| 5,187,802 A | 2/1993 | Inoue et al. | |
| 5,230,069 A | 7/1993 | Brelsford et al. | |
| 5,237,616 A | 8/1993 | Abraham et al. | |
| 5,255,379 A | 10/1993 | Melo | |
| 5,287,363 A | 2/1994 | Wolf et al. | |
| 5,293,424 A | 3/1994 | Hotley et al. | |
| 5,295,251 A | 3/1994 | Wakui et al. | |
| 5,317,705 A | 5/1994 | Gannon et al. | |
| 5,319,760 A | 6/1994 | Mason et al. | |
| 5,361,375 A | 11/1994 | Ogi | |
| 5,386,552 A | 1/1995 | Garney | |
| 5,421,006 A | 5/1995 | Jablon et al. | |
| 5,434,999 A | 7/1995 | Goire et al. | |
| 5,437,033 A | 7/1995 | Inoue et al. | |
| 5,442,645 A | 8/1995 | Ugon et al. | |
| 5,455,909 A | 10/1995 | Blomgren et al. | |
| 5,459,867 A | 10/1995 | Adams et al. | |
| 5,459,869 A | 10/1995 | Spilo | |
| 5,469,557 A | 11/1995 | Salt et al. | |
| 5,473,692 A | 12/1995 | Davis | |
| 5,479,509 A | 12/1995 | Ugon | |
| 5,504,922 A | 4/1996 | Seki et al. | |
| 5,506,975 A | 4/1996 | Onodera | |
| 5,511,217 A | 4/1996 | Nakajima et al. | |
| 5,522,075 A | 5/1996 | Robinson et al. | |
| 5,528,231 A | 6/1996 | Patarin | |
| 5,533,126 A | 7/1996 | Hazard et al. | |
| 5,555,385 A | 9/1996 | Osisek | |
| 5,555,414 A | 9/1996 | Hough et al. | |
| 5,560,013 A | 9/1996 | Scalzi et al. | |
| 5,564,040 A | 10/1996 | Kubals | |
| 5,566,323 A | 10/1996 | Ugon | |
| 5,568,552 A | 10/1996 | Davis | |
| 5,574,936 A | 11/1996 | Ryba et al. | |
| 5,582,717 A | 12/1996 | Di Santo | |
| 5,604,805 A | 2/1997 | Brands | |
| 5,606,617 A | 2/1997 | Brands | |
| 5,615,263 A | 3/1997 | Takahashi | |
| 5,628,022 A | 5/1997 | Ueno et al. | |
| 5,633,929 A | 5/1997 | Kaliski, Jr. | |
| 5,657,445 A | 8/1997 | Pearce | |
| 5,668,971 A | 9/1997 | Neufeld | |
| 5,680,131 A * | 10/1997 | Utz | 341/176 |
| 5,684,948 A | 11/1997 | Johnson et al. | |
| 5,706,469 A | 1/1998 | Kobayashi | |
| 5,717,903 A | 2/1998 | Bonola | |
| 5,720,609 A | 2/1998 | Pfefferle | |
| 5,721,222 A | 2/1998 | Bernstein et al. | |
| 5,729,760 A | 3/1998 | Poisner | |
| 5,737,604 A | 4/1998 | Miller et al. | |
| 5,737,760 A | 4/1998 | Grimmer, Jr. et al. | 711/163 |
| 5,740,178 A | 4/1998 | Jacks et al. | |
| 5,752,046 A | 5/1998 | Oprescu et al. | |
| 5,757,919 A | 5/1998 | Herbert et al. | |
| 5,764,969 A | 6/1998 | Kahle | |
| 5,796,835 A | 8/1998 | Saada | |
| 5,796,845 A | 8/1998 | Serikawa et al. | |
| 5,805,712 A | 9/1998 | Davis | |
| 5,809,546 A | 9/1998 | Greenstein et al. | |
| 5,818,939 A * | 10/1998 | Davis | 713/192 |
| 5,825,875 A | 10/1998 | Ugon | |
| 5,825,880 A | 10/1998 | Sudia et al. | |
| 5,835,594 A | 11/1998 | Albrecht et al. | |
| 5,844,986 A | 12/1998 | Davis | |
| 5,850,450 A * | 12/1998 | Schweitzer et al. | 380/30 |
| 5,852,717 A | 12/1998 | Bhide et al. | |
| 5,854,913 A | 12/1998 | Goetz et al. | |
| 5,867,577 A | 2/1999 | Patarin | |
| 5,872,994 A | 2/1999 | Akiyama et al. | |
| 5,890,189 A | 3/1999 | Nozue et al. | |
| 5,900,606 A | 5/1999 | Rigal | |
| 5,901,225 A | 5/1999 | Ireton et al. | |
| 5,903,752 A | 5/1999 | Dingwall et al. | |
| 5,919,257 A | 7/1999 | Trostle | |
| 5,935,242 A | 8/1999 | Madany et al. | |
| 5,935,247 A | 8/1999 | Pai et al. | |
| 5,937,063 A | 8/1999 | Davis | |
| 5,949,881 A * | 9/1999 | Davis | 713/189 |
| 5,953,502 A | 9/1999 | Helbig, Sr. | |
| 5,956,408 A | 9/1999 | Arnold | |
| 5,970,147 A | 10/1999 | Davis et al. | |
| 5,978,475 A | 11/1999 | Schneier et al. | |
| 5,978,481 A | 11/1999 | Ganesan et al. | |
| 5,987,557 A | 11/1999 | Ebrahim | |
| 6,014,745 A | 1/2000 | Ashe | |
| 6,035,374 A | 3/2000 | Panwar et al. | |
| 6,044,478 A | 3/2000 | Green | |
| 6,055,637 A | 4/2000 | Hudson et al. | |
| 6,058,478 A | 5/2000 | Davis | |
| 6,061,794 A | 5/2000 | Angelo | |
| 6,075,938 A | 6/2000 | Bugnion et al. | |
| 6,085,296 A | 7/2000 | Karkhanis et al. | |
| 6,088,262 A | 7/2000 | Nasu | |
| 6,092,095 A | 7/2000 | Maytal | |
| 6,093,213 A | 7/2000 | Favor et al. | |
| 6,101,584 A | 8/2000 | Satou et al. | |
| 6,108,644 A | 8/2000 | Goldschlag et al. | |
| 6,115,816 A | 9/2000 | Davis | |
| 6,125,430 A | 9/2000 | Noel et al. | |
| 6,131,166 A | 10/2000 | Wong-Isley | |
| 6,148,379 A | 11/2000 | Schimmel | |
| 6,158,546 A | 12/2000 | Hanson et al. | |
| 6,173,417 B1 | 1/2001 | Merrill | |
| 6,175,924 B1 | 1/2001 | Arnold | |
| 6,175,925 B1 | 1/2001 | Nardone et al. | |
| 6,178,509 B1 | 1/2001 | Nardone | |
| 6,182,089 B1 | 1/2001 | Ganapathy et al. | |
| 6,188,257 B1 | 2/2001 | Buer | |
| 6,192,455 B1 | 2/2001 | Bogin et al. | |
| 6,199,152 B1 | 3/2001 | Kelly et al. | |
| 6,205,550 B1 | 3/2001 | Nardone et al. | |
| 6,212,633 B1 * | 4/2001 | Levy et al. | 713/153 |
| 6,212,635 B1 | 4/2001 | Reardon | |
| 6,222,923 B1 | 4/2001 | Schwenk | |
| 6,249,872 B1 | 6/2001 | Wildgrube et al. | 713/200 |
| 6,252,650 B1 | 6/2001 | Nakaumra | |
| 6,269,392 B1 | 7/2001 | Cotichini et al. | |
| 6,272,533 B1 | 8/2001 | Browne | 709/213 |
| 6,272,637 B1 | 8/2001 | Little et al. | 713/194 |
| 6,275,933 B1 | 8/2001 | Fine et al. | |
| 6,282,650 B1 | 8/2001 | Davis | |
| 6,282,651 B1 | 8/2001 | Ashe | |
| 6,282,657 B1 | 8/2001 | Kaplan et al. | |
| 6,292,874 B1 | 9/2001 | Barnett | 711/153 |
| 6,301,646 B1 | 10/2001 | Hostetter | |
| 6,308,270 B1 | 10/2001 | Guthery et al. | |
| 6,314,409 B2 | 11/2001 | Schneck et al. | |
| 6,321,314 B1 | 11/2001 | Van Dyke | |
| 6,327,652 B1 | 12/2001 | England et al. | |
| 6,327,660 B1 * | 12/2001 | Patel | 713/193 |
| 6,330,670 B1 | 12/2001 | England et al. | |
| 6,339,815 B1 | 1/2002 | Feng | |
| 6,339,816 B1 | 1/2002 | Bausch | |

| | | | |
|---|---|---|---|
| 6,357,004 B1 | 3/2002 | Davis | |
| 6,363,485 B1 | 3/2002 | Adams | |
| 6,374,286 B1 | 4/2002 | Gee et al. | |
| 6,374,317 B1 | 4/2002 | Ajanovic et al. | 710/105 |
| 6,378,068 B1 | 4/2002 | Foster | |
| 6,378,072 B1 | 4/2002 | Collins et al. | |
| 6,389,537 B1 | 5/2002 | Davis et al. | |
| 6,397,242 B1 | 5/2002 | Devine et al. | |
| 6,397,328 B1 * | 5/2002 | Pitchenik et al. | 713/155 |
| 6,397,379 B1 | 5/2002 | Yates, Jr. et al. | |
| 6,412,035 B1 | 6/2002 | Webber | |
| 6,421,702 B1 | 7/2002 | Gulick | |
| 6,435,416 B1 | 8/2002 | Slassi | |
| 6,445,797 B1 | 9/2002 | McGough et al. | |
| 6,463,535 B1 | 10/2002 | Drews et al. | |
| 6,463,537 B1 | 10/2002 | Tello | |
| 6,499,123 B1 | 12/2002 | McFarlane et al. | |
| 6,505,279 B1 | 1/2003 | Phillips et al. | |
| 6,507,904 B1 | 1/2003 | Ellison et al. | |
| 6,529,909 B1 | 3/2003 | Bowman-Amuah | |
| 6,535,988 B1 | 3/2003 | Poisner | |
| 6,557,104 B2 | 4/2003 | Vu et al. | |
| 6,560,627 B1 | 5/2003 | McDonald et al. | |
| 6,609,199 B1 | 8/2003 | DeTreville | |
| 6,615,278 B1 | 9/2003 | Curtis | |
| 6,633,963 B1 | 10/2003 | Ellison et al. | |
| 6,633,981 B1 | 10/2003 | Davis | |
| 6,651,171 B1 | 11/2003 | England et al. | |
| 6,678,825 B1 | 1/2004 | Ellison et al. | |
| 6,684,326 B1 | 1/2004 | Cromer et al. | |
| 6,760,441 B1 * | 7/2004 | Ellison et al. | 380/45 |
| 7,013,481 B1 * | 3/2006 | Ellison et al. | 726/4 |
| 2001/0021969 A1 | 9/2001 | Burger et al. | |
| 2001/0027527 A1 | 10/2001 | Khidekel et al. | |
| 2001/0037450 A1 | 11/2001 | Metlitski et al. | |
| 2003/0196085 A1 | 10/2003 | Lampson et al. | |

FOREIGN PATENT DOCUMENTS

| | | |
|---|---|---|
| EP | 0473913 | 3/1992 |
| EP | 0600112 | 6/1994 |
| EP | 0892521 | 1/1999 |
| EP | 0930567 | 7/1999 |
| EP | 0961193 | 12/1999 |
| EP | 1030237 | 8/2000 |
| EP | 1055989 | 11/2000 |
| EP | 1056014 | 11/2000 |
| EP | 1085396 | 3/2001 |
| EP | 1146715 | 10/2001 |
| JP | 2000076139 | 3/2000 |
| WO | WO9524696 | 9/1995 |
| WO | WO9729567 | 8/1997 |
| WO | WO9812620 | 3/1998 |
| WO | WO9834365 | 8/1998 |
| WO | WO9844402 | 10/1998 |
| WO | WO9905600 | 2/1999 |
| WO | WO9918511 | 4/1999 |
| WO | WO9957863 | 11/1999 |
| WO | WO99/65579 | 12/1999 |
| WO | WO0021238 | 4/2000 |
| WO | WO0062232 | 10/2000 |
| WO | WO0127723 | 4/2001 |
| WO | WO0127821 | 4/2001 |
| WO | WO0163994 | 8/2001 |
| WO | WO0175565 | 10/2001 |
| WO | WO0175595 | 10/2001 |
| WO | WO0201794 | 1/2002 |
| WO | WO9909482 | 1/2002 |
| WO | WO0217555 | 2/2002 |
| WO | WO02060121 | 8/2002 |
| WO | WO0175564 | 10/2002 |
| WO | WO02086684 | 10/2002 |
| WO | WO03058412 | 7/2003 |

OTHER PUBLICATIONS

Menezes et al., Handbook of Applied Cryptography, 1997, CRC Press, pp. 388-397.*

Menezes et al., Handbook of Applied Cryptography, 1997, CRC Press, pp. 490-504.*

Berg, Cliff , "How Do I Create a Signed Applet?", *Dr. Dobb's Journal*, (Aug. 1997),1-9.

Brands, Stefan , "Restrictive Blinding of Secret-Key Certificates", *Springer-Verlag* XP002201306, (1995),Chapter 3.

Chen, Andrew A., et al., "Safe and Protected Execution for the Morph/AMRM Reconfigurable Processor", *7th Annual IEEE Symposium, FCCM '99 Proceedings*, XP010359180, ISBN 0-7695-0375-6, Los Alamitos, CA, (Apr. 21, 1999),209-221.

Compaq Computer Corporation, et al., "Trusted Computing Platform Alliance (TCPA) Main Specification Version 1.1a", (Dec. 2001),1-321.

Davida, George I., et al., "Defending Systems Against Viruses through Cryptographic Authentication", *Proceedings of the Symposium on Security and Privacy*, IEEE Comp. Soc. Press, ISBn 0-8186-1939-2,(May 1989).

Goldberg, Robert P., "Survey of Virtual Machine Research", *COMPUTER Magazine*, (Jun. 1974), cover, contents, 34-35.

Gong, Li , et al., "Going Behond the Sandbox: An Overview of the New Security Architecture.in the Java Development Kit 1.2", *Proceedings of the USENIX Symposium on Internet Technologies and Systems*, Monterey, CA,(Dec. 1997).

Gum, P. H., "System/370 Extended Architecture: Facilities for Virtual Machines", *IBM J. Research Development*, vol. 27, No. 6, (Nov. 1983),530-544.

Heinrich, Joe , "MIPS R4000 Microprocessor User's Manual, Second Edition", *Chapter 4 "Memory Management"*, (Jun. 11, 1993),61-97.

IBM, "Information Display Technique for a Terminiate Stay Resident Program IBM Technical Disclosure Bulletin", *TDB-ACC-No. NA9112156*, vol. 34, Issue 7A, (Dec. 1, 1991),156-158.

INTEL, "Intel386 DX Microprocessor 32-Bit CHMOS Microprocessor With Integrated Memory Management", (1995), 1-56.

Karger, Paul A., et al., "A VMM Security Kernal for the VAX Architecture", *Proceedings of the Symposium on Research in Security and Privacy*, XP010020182, ISBN 0-8186-2060-9, Boxborough, MA, (May 7, 1990),2-19.

Kashiwagi, Kazuhiko , et al., "Design and Implementation of Dynamically Reconstructing System Software", *Software Engineering Conference*, Proceedings 1996 Asia-Pacific Seoul, South Korea Dec. 4-7, 1996, Los Alamitos, CA USA, IEEE Comput. Soc, US, ISBN 0-8186-7638-8,(1996).

Lawton, Kevin , et al., "Running Multiple Operating Systems Concurrently on an IA32 PC Using Virtualization Techniques", http://www.plex86.org/research/paper/txt, (Nov. 29, 1999),1-31.

Luke, Jahn , et al., "Replacement Strategy for Aging Avionics Computers", *IEEE AES Systems Magazine*, XP002190614,(Mar. 1999).

Menezes, Oorschot , "Handbook of Applied Cryptography", *CRC Press LLC*, USA XP002201307, (1997),475.

MOTOROLA, "M68040 User's Manual", (1993), cover, vi-xxiii, 1-1 to 8-32.

Richt, Stefan , et al., "In-Circuit-Emulator Wird Echtzeittauglich", *Elektronic, Franzis Verlag GMBH*, Munchen, DE, vol. 40, No. 16, XP000259620,(100-103),Aug. 6, 1991.

Robin, John S., et al., "Analysis of the Pentium's Ability to Support a Secure Virtual Machine Monitor", *Proceedings of the 9th USENIX Security Symposium*, XP002247347, Denver, Colorado, (Aug. 14, 2000),1-17.

Rosenblum, M. , "Virtual Platform: A Virtual Machine Monitor for Commodity PC", *Proceedings of the 11th Hotchips Conference*, (Aug. 17, 1999), 185-196.

Saez, Sergio , et al., "A Hardware Scheduler for Complex Real-Time Systems", *Proceedings of the IEEE International Symposium on Industrial Electronics*, XP002190615,(Jul. 1999),43-48.

Sherwood, Timothy, et al., "Patchable Instruction ROM Architecture", *Department of Computer Science and Engineering, University of California*, San Diego, La Jolla, CA, (Nov. 2001), 24-33.

Coulouris, George, et al., "Distributed Systems, Concepts and Designs", *2nd Edition*, (1994),422-424.

Crawford, John, "Architecture of the Intel 80386", *Proceedings of the IEEE International Conference on Computer Design: VLSI in Computers and Processors* (ICCD '86), (Oct. 6, 1986),155-160.

Fabry, R.S., "Capability-Based Addressing", Fabry, R.S., "*Capability-Based Addressing,*" *Communications of the ACM*, vol. 17, No. 7, (Jul. 1974),403-412.

Frieder, Gideon, "The Architecture And Operational Characteristics of the VMX Host Machine", *The Architecture And Operational Characteristics of the VMX Host Machine, IEEE*, (1982),9-16.

Intel Corporation, "Intel 82802AB/82802AC Firmware Hub (FWH)", *Intel Product Datasheet*, Document No. 290658-004,(Nov. 2000), 1-6, 17-28.

Menezes, Alfred J., et al., "Handbook of Applied Cryptography", *CRC Press Series on Discrete Mathematics and its Applications*, Boca Raton, FL, XP002165287, ISBN 0849385237,(Oct. 1996),403-405, 506-515, 570.

Nanba, S., et al., "VM/4: ACOS-4 Virtual Machine Architecture", *VM/4: ACOS-4 Virtual Machine Architecture, IEEE*, (1985),171-178.

RSA SECURITY, "Hardware Authenticators", www.rsasecurity.com/node.asp?id=1158, 1-2.

RSA SECURITY, "RSA SecurID Authenticators", www.rsasecurity.com/products/securid/datasheets/SID_DS_0103.pdf, 1-2.

RSA SECURITY, "Software Authenticators", www.srasecurity.com/node.asp?id=1313, 1-2.

Schneier, Bruce, "Applied Cryptography: Protocols, Algorithm, and Source Code in C", *Wiley, John & Sons, Inc.*, XP002939871; ISBN 0471117099,(Oct. 1995),47-52.

Schneier, Bruce, "Applied Cryptography: Protocols, Algorithm, and Source Code in C", *Wiley, John & Sons, Inc.*, XP002138607; ISBN 0471117099,(Oct. 1995),56-65.

Schneier, Bruce, "Applied Cryptography: Protocols, Algorithms, and Source Code C", *Wiley, John & Sons, Inc.*, XP0021111449; ISBN 0471117099,(Oct. 1995),169-187.

Schneier, Bruce, "Applied Cryptography: Protocols, Algorithms, and Source Code in C", *2nd Edition; Wiley, John & Sons, Inc.*, XP002251738; ISBN 0471128457,(Nov. 1995),28-33; 176-177; 216-217; 461-473; 518-522.

* cited by examiner

CREATION AND DISTRIBUTION OF A SECRET VALUE BETWEEN TWO DEVICES

BACKGROUND

1. Field

This invention relates to the field of data security. In particular, the invention relates to a platform and method for generating and distributing a secret value between multiple devices.

2. Background

In electronic commerce, it is becoming necessary to transmit digital data from one location to another in a manner that is clear and unambiguous to a legitimate receiver, but incomprehensible to any illegitimate recipients. Accordingly, such data is typically encrypted by a software application executing some predetermined encryption algorithm and is transmitted to the legitimate receiver in encrypted form. The legitimate receiver then decrypts the transmitted data for use. Often, encryption/decryption of data is accomplished through symmetric key cryptography. For symmetric key cryptography, the sender uses a secret value as a key to encrypt data prior to transmission over an unsecured link. The receiver uses the same secret value as a key to decrypt the data upon receipt. One problem associated with symmetric key cryptography is that it is difficult for devices, such as platforms or integrated circuit components for example, to distribute a secret value in a secure manner.

BRIEF DESCRIPTION OF THE DRAWINGS

The features and advantages of the present invention will become apparent from the following detailed description of the present invention in which.

DESCRIPTION

The present invention relates to a platform and method for generating and distributing a secret value between multiple devices. The specific manner selected in generating the secret value can provide two advantages; namely, it can logically bind the devices together for subsequent verification that the devices are in close physical proximity to one another and mitigates replay attacks.

Herein, certain details are set forth in order to provide a thorough understanding of the present invention. It is apparent to a person of ordinary skill in the art, however, that the present invention may be practiced through many embodiments other that those illustrated. Well-known circuits are not set forth in detail in order to avoid unnecessarily obscuring the present invention.

In the following description, certain terminology is used to discuss features of the present invention. For example, a "device" includes include one or more integrated circuit components or one or more products that process data such as a computer (e.g., desktop, laptop, server, workstation, personal digital assistant, etc.), a computer peripheral (e.g., printer, facsimile, modem, etc.), wireless communication device (e.g., telephone handset, pager, etc.), a television set-top box and the like. A "link" is broadly defined as a logical or physical communication path such as, for instance, electrical wire, optical fiber, cable, bus trace, or even a wireless channel using infrared, radio frequency (RF), or any other wireless signaling mechanism.

In addition, "information" is generally defined as one or more bits of data, address, control or any combination thereof. "Code" includes software or firmware that, when executed, performs certain functions. Examples of different types of code include an application, an applet, or any series of instructions. A "communication session" is a series of operations used to transfer information between two platforms in a secure manner. The session may terminate automatically when the transfer of information has completed, after a predetermined time has elapsed, or under control by any of the communication session participants.

I. General Platform Architecture

Figure 1:
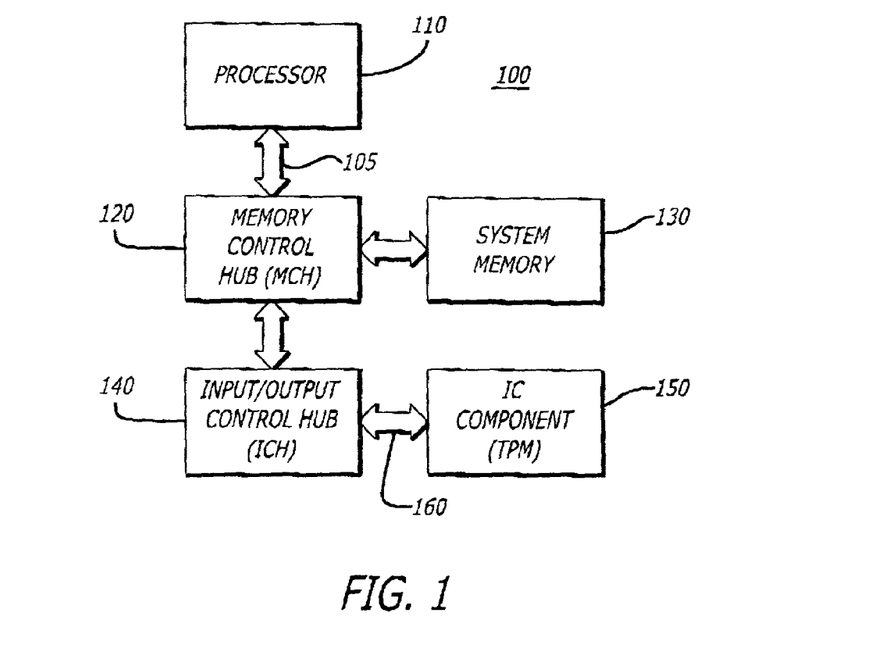
FIG. 1 is an exemplary embodiment of a platform practicing the invention.

Referring to FIG. 1, an exemplary block diagram of an illustrative embodiment of a platform 100 employing the present invention is shown. The platform 100 comprises a processor 110, a memory control hub (MCH) 120, a system memory 130, an input/output control hub (ICH) 140, and an integrated circuit (IC) component 150 which controls security of the platform 100. The components of platform 100 may be employed on any substrate (e.g., circuit board, removable card, etc.) or multiple substrates.

As shown in FIG. 1, the processor 110 represents a central processing unit of any type of architecture, such as complex instruction set computers (CISC), reduced instruction set computers (RISC), very long instruction word (VLIW), or a hybrid architecture. In one embodiment, the processor 110 is compatible with the INTEL® Architecture (IA) processor, such as the IA-32 and the IA-64. Of course, in an alternative embodiment, the processor 110 may include multiple processing units coupled together over a common host bus 105.

Coupled to the processor 110 via the host bus 105, the MCH 120 may be integrated into a chipset that provides control and configuration of memory and input/output (I/O) devices such as the system memory 130 and the ICH 140. Typically, the system memory 130 stores system code and data. The system memory 130 is typically implemented with dynamic random access memory (DRAM) or static random access memory (SRAM).

The ICH 140 may also be integrated into a chipset together with or separate from the MCH 120 to perform I/O functions. As shown, the ICH 140 supports communications with the IC component 150 via link 160. Also, the ICH 140 supports communications with components coupled to other links such as a Peripheral Component Interconnect (PCI) bus at any selected frequency (e.g., 66 megahertz "MHz", 100 MHz, etc.), an Industry Standard Architecture (ISA) bus, a Universal Serial Bus (USB), a Firmware Hub bus, or any other bus configured with a different architecture other than those briefly mentioned.

Figure 2:
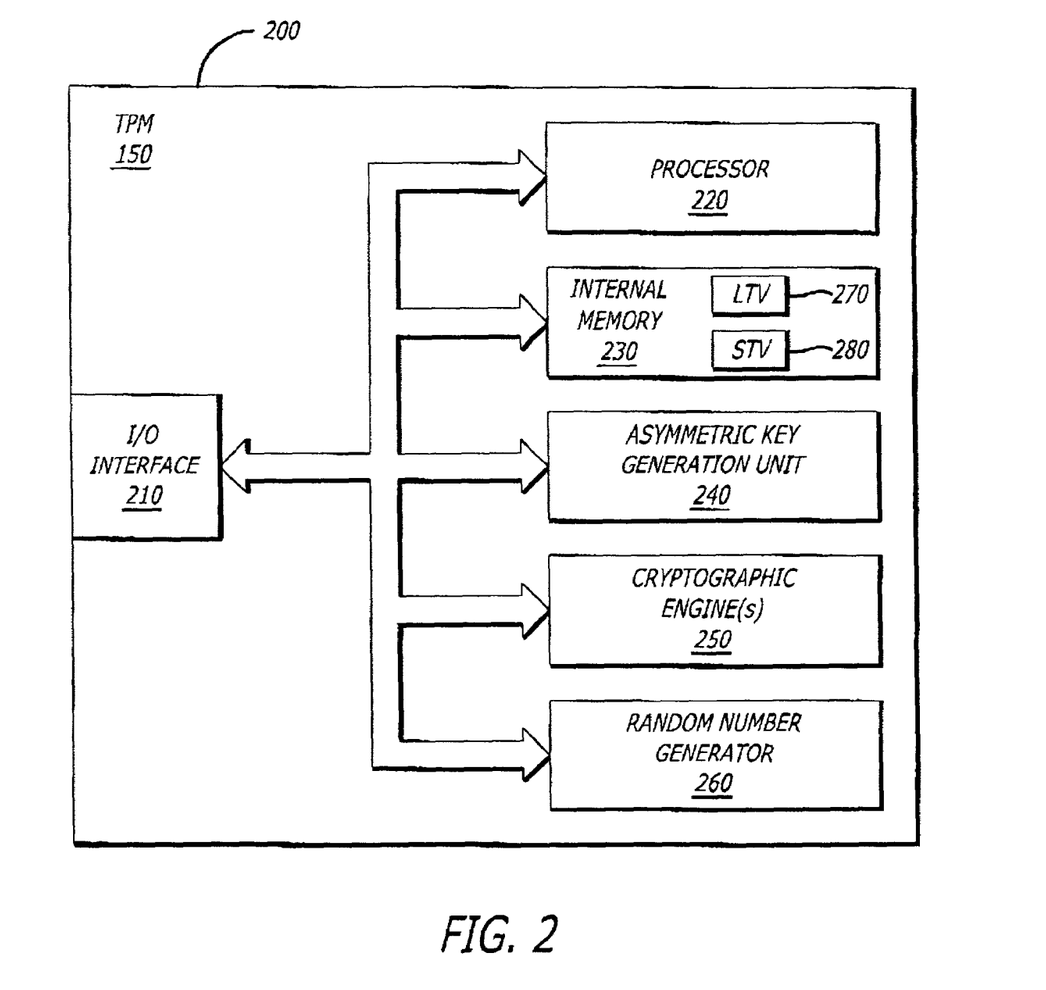
FIG. 2 is an exemplary embodiment of an integrated circuit (IC) component as a Trusted Platform Module (TPM) employed within the platform of FIG. 1.

Referring to FIG. 2, an exemplary embodiment of the IC component 150 is shown as a Trusted Platform Module (TPM), which features one or more integrated circuits placed within a protective package 200. For instance, the protective package 200 may be any type of IC package such as an IC package for a single IC or a package for a multi-chip module. Alternatively, the protective package 200 may include a cartridge or casing covering a removable circuit board featuring the integrated circuit(s) and the like.

As shown in FIG. 2, the TPM 150 comprises an I/O interface 210, a processor 220, internal memory 230, an asymmetric key generation unit 240, at least one cryptographic engine 250 and a random or pseudo random number generator 260 (generally referred to as a "number generator"). The number generator 260 may be employed within the asymmetric key generation unit 240 or operates in cooperation therewith.

Herein, the internal memory 230 includes one or more memory components, including at least non-volatile memory and perhaps volatile memory. Typically, these different memory types are employed as different components.

In general, the number generator 260 (or alternatively the asymmetric key generation unit 240) generates a "long-term value" (LTV) 270 and a "short-term value" (STV) 280. The LTV 270 is stored within the non-volatile memory of the internal memory 230 while the STV 280 can be stored in either a non-volatile or volatile memory. Collectively, these values produce a secret value (SV) that is used as a cryptographic key for transmission of data between the ICH 140 and TPM 150 over link 160 in an encrypted and/or decrypted format.

The cryptographic engine(s) 250 supports encryption/decryption, digital signing and hashing operations. Although the cryptographic engine(s) 250 is illustrated as logic separate from the processor 220, it is contemplated that it may employed as part of the processor 220.

II. LTV Generation

Figure 3:
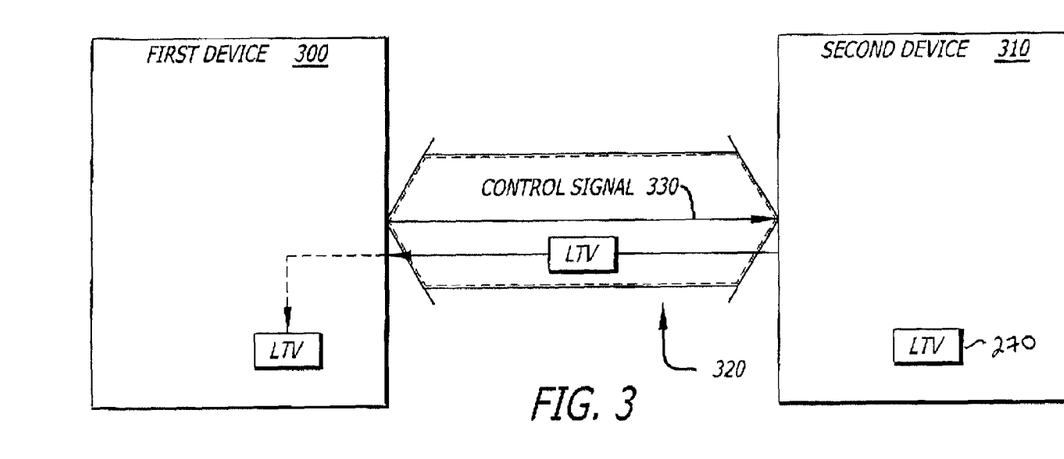
FIG. 3 is an exemplary embodiment of the generation of a Long Term Value (LTV).

Referring now to FIG. 3, an exemplary embodiment of a block diagram illustrating the generation of a long term value (LTV) 270 is shown. In this embodiment, generation of the LTV 270 occurs in response to an event such as an initial power-up sequence by a substrate or platform featuring two or more devices 300 and 310 that are attempting to establish at least one secure communication channel over link 320. This power-up sequence may be performed during assembly of the platform, most likely during power-up of certain communicative devices after installation on the substrate.

In general, at initial power-up, the first device 300 may issue a control signal 330 to the second device 310, which signals the second device 310 to internally generate the LTV 270. Thereafter, the LTV 270 is permanently stored in a protected memory location such as, for example, within internal, non-volatile memory of the second device 310. In addition, the second device 310 also transmits the LTV 270 to the first device 300 for internal storage as well. Both devices 300 and 310 are now configured to ensure that the LTV 270 cannot be reprogrammed at a later time.

Figure 4:
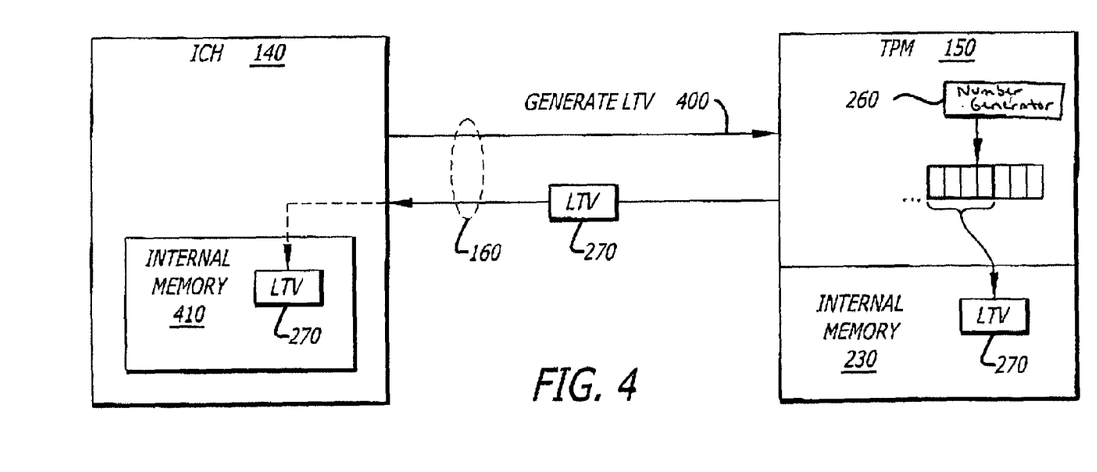
FIG. 4 is a more detailed embodiment of the generation of a Long Term Value (LTV) between the TPM and ICH of the platform of FIG. 1.

More specifically, for an embodiment featuring components of platform 100 of FIG. 1, the ICH 140 detects an initial event (e.g., first power-up sequence) and is in communication with the TPM 150. As shown in FIG. 4, upon detecting the initial power-up sequence, the ICH 140 issues a special command 400, referred to herein as "GenerateLTV," to the TPM 150 over link 160.

In response to receiving the GenerateLTV command 400, the TPM 150 generates the LTV 270. This may be accomplished by taking the next 160 bits from the number generator 260 employed within the TPM 150 for example. The TPM 150 saves the LTV 270 in non-volatile memory of internal memory 230 and protects this information from any modification or observation.

After generating the LTV 270, the TPM 150 returns the LTV 270 to the ICH 140 over link 160 as a response to the GenerateLTV command. The ICH 140 takes the LTV 270 and stores this value in an internal, non-volatile memory 410 of the ICH 140. The contents of the non-volatile memory 410 are protected from modification or observation.

As briefly described above, the GenerateLTV command is a one-time only command. The ICH 140 may be configured to protect itself from ever issuing this command again. One method of accomplishing this protection is to have the command protected by a fuse (not shown). Once the operation has completed, the LTV installer would blow the fuse so that the command would never be executable again. This fuse operation must also occur in the TPM 150 for the same reason.

III. STV Generation

Figure 5:
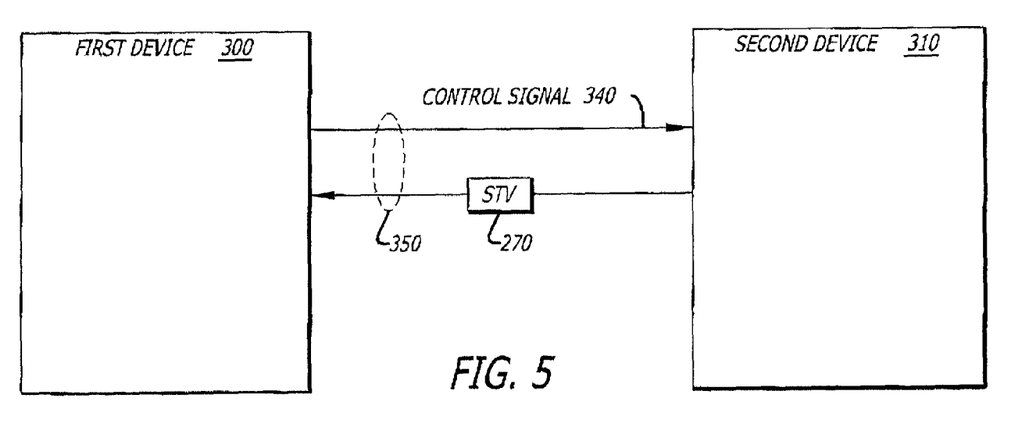
FIG. 5 is an exemplary embodiment of the generation of a Short Term Value (STV).

Referring to FIG. 5, an exemplary embodiment of a block diagram illustrating the generation of a short term value (STV) is shown. Generation of the STV 280 occurs in response to a periodic event such as during initialization of the devices within the platform for example. The STV 280 is stored in volatile memory of both first and second devices and is lost when power is disrupted to any of the devices.

In general, during a power-up cycle of the substrate or platform, the first device 300 locates the second device 310 and requests generation of the STV 280 by issuing a control signal 340 over link 350. The second device 310 generates a short term value once per power cycle. The STV 280 may be generated by a number generator for each power cycle or initially generated by the number generator in response to the power cycle and subsequently incremented for each communication session. Thus, the STV would operate as a rolling nonce. The STV 280 is provided to the first device 300 for subsequent, temporary storage.

Figure 6:
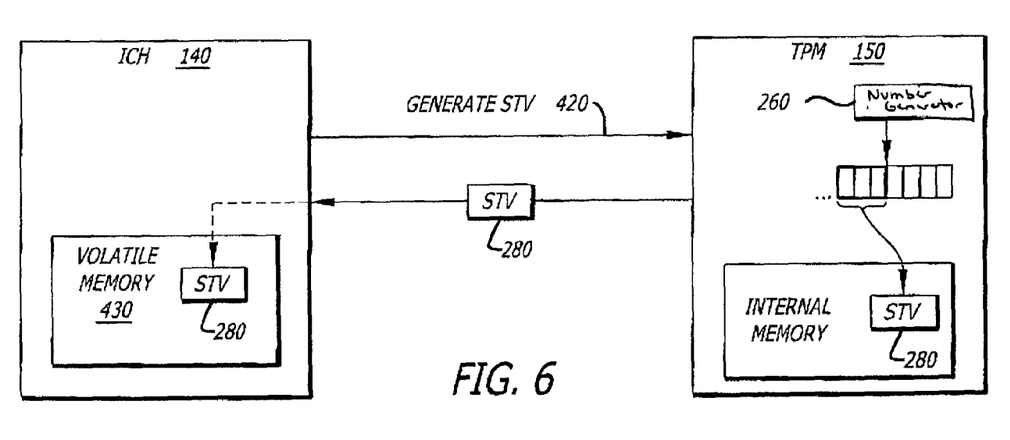
FIG. 6 is a more detailed embodiment of the generation of a Short Term Value (LTV) between the TPM and ICH of the platform of FIG. 1.

More specifically, for an embodiment featuring components of platform 100 of FIG. 1, the first device (e.g., ICH 140) issues a special command 420, referred to as a "GenerateSTV" command, to the second device (e.g., TPM 150) as shown in FIG. 6. In response to receiving the GenerateSTV command 420, the TPM 150 generates the STV 280. This may be accomplished by taking the next 160 bits from the number generator 260 employed within the TPM 150 for example. In this embodiment, the TPM 150 stores the STV 280 in a portion of internal memory 230 that may be volatile (as shown) or even erasable, non-volatile memory.

Moreover, the TPM 150 returns the STV 280 to the ICH 140 over link 160 as a response to the GenerateSTV command. The ICH 140 takes the STV 280 and stores this value in volatile memory 430 of the ICH 140. Both the ICH 140 and 150 protect the GenerateSTV command from multiple executions by using a sticky bit to only allow one operation per power cycle.

IV. Secret Value Generation

Figure 7:
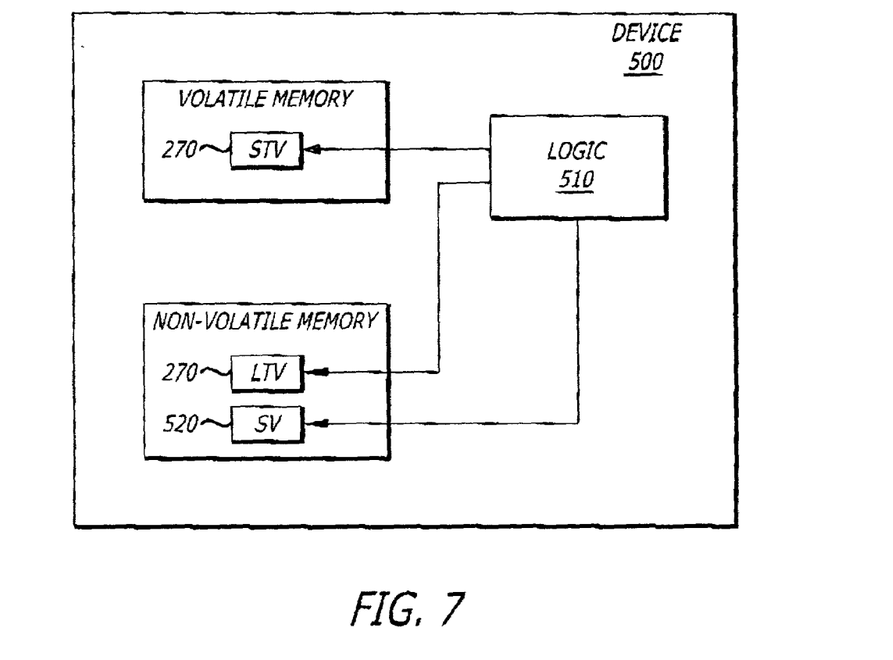
FIG. 7 is an exemplary embodiment of a block diagram for generation of a unique secret value for a communication session through the combination of the LTV and the STV internally within a device.

Referring now to FIG. 7, both the LTV 270 and STV 280 are stored in non-volatile memory of a device 500 (e.g., TPM/second device 150/310 set forth above) and protected from observation and manipulation. The LTV 270 and STV 280, when combined by logic 510, generate a secret value (SV) 520. The SV 520 may be used by both devices as a cryptographic key to establish at least one secure communication channel between the multiple devices. Since the STV 280 is different for each power cycle, the SV 520 is unique for each communication session. This operation of combining the LTV 270 and the STV 280 is performed within each of the devices and is never provided outside the device over the communication link.

The term "combined" (or any tense thereof) is generally defined as a bit manipulation of two values such as a one-way hashing operation which converts a sequence of bits into a unique value having a fixed bit length. Thus, the logic 510 that performs the combining operation may be the processor 220 or the cryptographic unit 250. Of course, logic 510 maybe configured to be independent from the processor 220 and the cryptographic unit 250.

V. Additional Security Features

It is contemplated that a link interconnecting a first device (e.g., an ICH) and a second device (e.g., a TPM) may be configured to support special bus cycles. These special bus cycles provide the second device greater assurances that the first device transmitted a signal (e.g., Generate STV) instead of an unauthorized outside source. In essence, this provides assurances that the first and second devices were in close proximity during manufacture.

Another feature is to initiate a time limit for receipt of the STV in response to the GenerateSTV command. This may be accomplished by employing a counter or other timing mechanism within the first device and determining whether the STV is provided by the second device before a selected time or count has elapsed. By imposing a time constraint, it provides greater assurances that the devices are in close proximity.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Additionally, it is possible to implement the present invention or some of its features in hardware, firmware, software or a combination thereof where the software is provided in a processor readable storage medium such as a magnetic, optical, or semiconductor storage medium.

What is claimed is:

1. A method comprising:
   transmitting a first command from a second device being an input/output control hub (ICH) to a first device being a trusted platform module (TPM);
   generating a long term value within the first device, the long term value generated upon detecting an initial power-up sequence and receipt of information from the second device;
   permanently storing the long term value within a protected area of an internal memory of the first device;
   providing the long term value to the second device communicatively coupled to the first device;
   generating a short term value within the first device, the short term value is modified after each power cycle;
   providing the short term value to the second device;
   generating a secret value within the first device after each power cycle, the secret value being a combination of both the long term value and the short term value;
   generating the secret value within the second device based on the long term value and the short term value; and
   using the secret value to encrypt and decrypt data transmitted between the first device and the second device.

2. The method of claim 1, wherein the long term value is generated in response to an initial power-up sequence when the first device is in communication with the second device.

3. The method of claim 2, wherein prior generating the short term value, the method further comprises:
   transmitting a second command from the second device to the first device.

4. The method of claim 1, wherein the combination is a result produced by successively performing a hashing operation on both the data and the short term value.

* * * * *